United States Patent [19]
Knappe et al.

[11] Patent Number: 5,761,295
[45] Date of Patent: *Jun. 2, 1998

[54] TELEPHONE INSTRUMENT AND METHOD FOR ALTERING AUDIBLE CHARACTERISTICS

[75] Inventors: Michael Edmund Knappe, Ottawa; Brian Ross Shelton, Kanata, both of Canada

[73] Assignee: Northern Telecom Limited, Montreal, Canada

[*] Notice: The term of this patent shall not extend beyond the expiration date of Pat. No. 5,485,514.

[21] Appl. No.: 440,358

[22] Filed: May 11, 1995

Related U.S. Application Data

[63] Continuation-in-part of Ser. No. 220,653, Mar. 31, 1994, Pat. No. 5,485,514.

[51] Int. Cl.⁶ ............................................. H04M 11/00
[52] U.S. Cl. ........................ 379/387; 379/61; 379/430; 381/63; 381/183
[58] Field of Search ............................. 379/387, 430, 379/61, 368, 52; 381/63, 187, 183, 68, 68.1, 103

[56] References Cited

U.S. PATENT DOCUMENTS

| | | | |
|---|---|---|---|
| 4,338,581 | 7/1982 | Morgan | 333/165 |
| 5,086,464 | 2/1992 | Groppe | 379/52 |
| 5,113,428 | 5/1992 | Fitzgerald | 379/61 |
| 5,146,507 | 9/1992 | Satoh et al. | 381/103 |
| 5,381,486 | 1/1995 | Ludeke et al. | 381/187 |

*Primary Examiner*—Krista M. Zele
*Assistant Examiner*—Jacques M. Saint-Surin
*Attorney, Agent, or Firm*—J. E. Moorhouse

[57] ABSTRACT

A telephone instrument creates spatially simulated sound signals from signals received from a telephone line. The monaural signals are separated to two left and right channels. In each channel, the signals are processed via a direct path, an early reflection path including a finite impulse response filter and a reverberant decay path including all-pass filter. In each channel, the outputs from the three paths are summed with different weights.

12 Claims, 6 Drawing Sheets

TELEPHONE INSTRUMENT AND METHOD FOR ALTERING AUDIBLE CHARACTERISTICS

CROSS REFERENCE

This is a continuation-in-part application of U.S. patent application Ser. No. 08/220,653, filed on 31 Mar. 1994 by M. Knappe et al, now U.S. Pat. No. 5,485,514.

TECHNICAL FIELD

The present invention relates to a telephone instrument and method for altering audible characteristics and in particular, to spatially simulated signals generated from signals from a telephone line.

BACKGROUND ART

A telephone instrument usually includes a microphone which functions as a transmitter and an earphone which functions as a receiver. The transmitter and the receiver are coupled to a telephone line by an interface. In an analog telephone set, for example, the interface performs a hybrid function which includes directing signals from the transmitter to the telephone line and directing signals from the telephone line to the receiver.

A telephone operator or attendant may use a headset which includes a microphone and a single earphone or a pair of earphones for left and right ears. At present, there is little advantage to using a pair of earphones as the signals on the telephone line lack binaural information. Hence, the telephone user must listen to sounds which lack the quality of sounds from a normal listening environment.

U.S. Pat. No. 4,694,497 granted to Junichi Kasai et al on Sep. 15, 1987 and U.S. Pat. No. 4,953,219 granted to Junichi Kasai on Aug. 28, 1990 disclose reproduction of stereophonic sound signals adapted to multiple speakers from a stereo sound signal. This, however, is not applicable to reproduction of sounds characteristic of a normal listening environment from monaural sound signals.

U.S. Pat. No. 4,338,581 granted to Nelson H. Morgan on Jul. 6, 1982 discloses room sound simulation. M. R. Schroeder teaches artificial reverberation in the Journal of the Audio Engineering Society, Vol. 10, p. 219–223 (July 1962). Neither, however, suggests reproduction of sounds characteristic of a normal listening environment from monaural sound signals.

U.S. Pat. No. 5,113,428 granted to Robert Fitzgerald on May 12, 1992 discloses a cordless telephone headset comprising a transmitter and receiver which are operatively connected to a microphone, a pair of earphone speakers and to a portable transceiver unit. The transmitter and receiver are operatively connected to the telephone line and to a base unit transceiver antenna. However, the same signal is provided to the pair of earphone speakers and thus this is not applicable to reproduce sounds characteristic of a normal listening environment from monaural sound signals.

SUMMARY OF THE INVENTION

It is an object of the present invention to provide a telephone instrument and method for altering a voice signal received from a telephone line to simulate a characteristic of spatial presence.

According to one aspect of the present invention, there is provided a telephone instrument for receiving signals from and for transmitting signals to a telephony apparatus via a telephone line, the telephone instrument comprising: transmitter means; first and second receiver means for use in acoustical association with the left ear and the right ear, respectively, of a user of the telephone instrument; signal coupling means including signal receiving means and signal transmitting means, the signal receiving means dividing a signal from the telephone line to first and second received signals, the signal transmitting means transmitting signals from the transmitter means to the telephone line; a first received signal processing means for altering an audible phase characteristic of the first received signal, thereby providing a first characteristic altered signal to the first receiver means; and a second received signal processing means for altering an audible phase characteristic of the second received signal, thereby providing a second characteristic altered signal to the second receiver means, the audible phase characteristic of the second characteristic altered signal being at variance with those of the first characteristic altered signal.

Also, in accordance with another aspect of the present invention, there is provided a method for providing telephony communications with a telephone user, comprising the steps of: coupling signals of the user's origin from a transmitter means to a telephone line; dividing a signal destined for the telephone user from the telephone line to first and second received signals; altering an audible characteristic of the first received signal in accordance with a first predetermined set of coefficients, thereby providing a first altered signal of an audible phase characteristic to a first receiver means; altering an audible characteristic of the second received signal in accordance with a second predetermined set of coefficients, thereby providing a second altered signal of an audible phase characteristic to a second receiver means, the first and second receiver means forming a pair of receiver means, the audible phase characteristic of the second altered signal being at variance with those of the first altered signal.

In an example of the present invention, the signals coupled to both receiver means are at variance in phase, so that the telephone user perceives a spatial orientation, as if the other party to the telephone communication were actually somewhere nearby.

In one embodiment of the present invention, there are three signal processing paths in each channel: a direct path, a finite impulse processing path and an all-pass signal processing path. The outputs from the three paths are summed in each channel with different weights. The resultant sounds provide a perceivable spatial quality for the listener.

BRIEF DESCRIPTION OF THE DRAWINGS

An embodiment of the invention will now be described by way of example with reference to the accompanying drawings in which.

3

Figure 1:
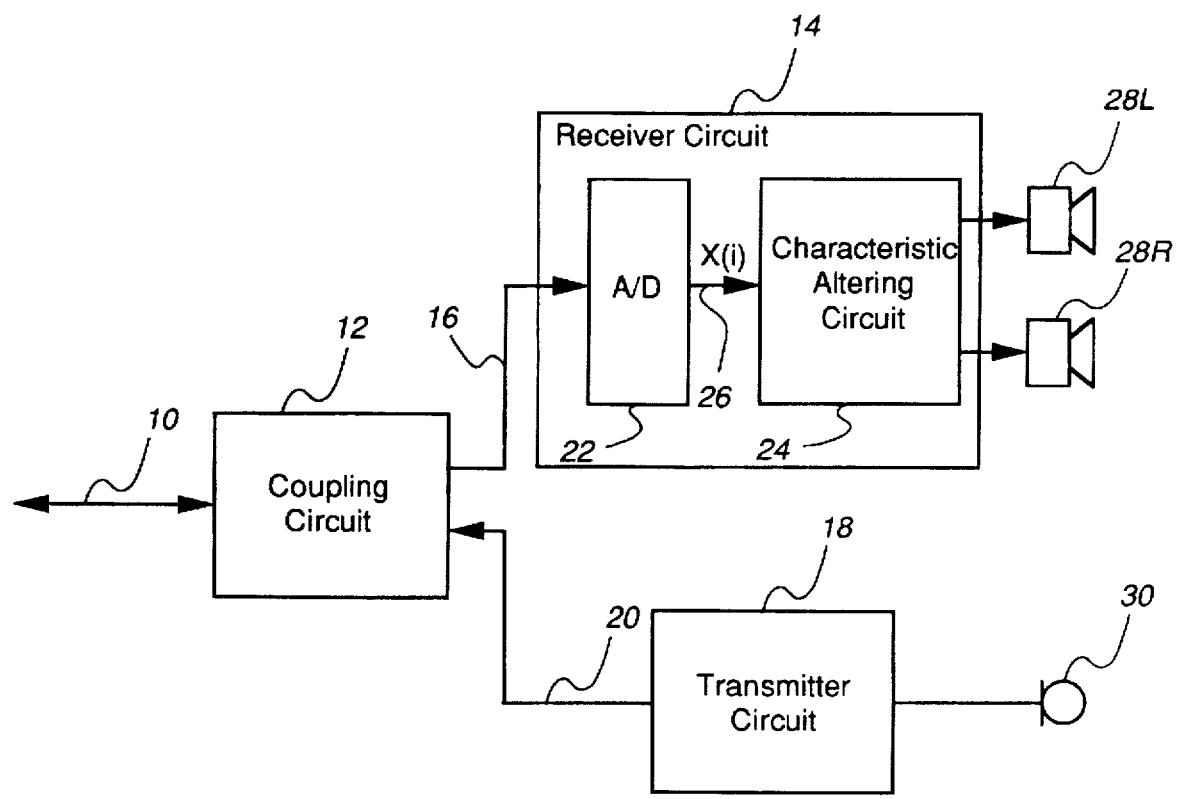
FIG. 1 is a block diagram of a telephone instrument according to the present invention.
Figure 6:
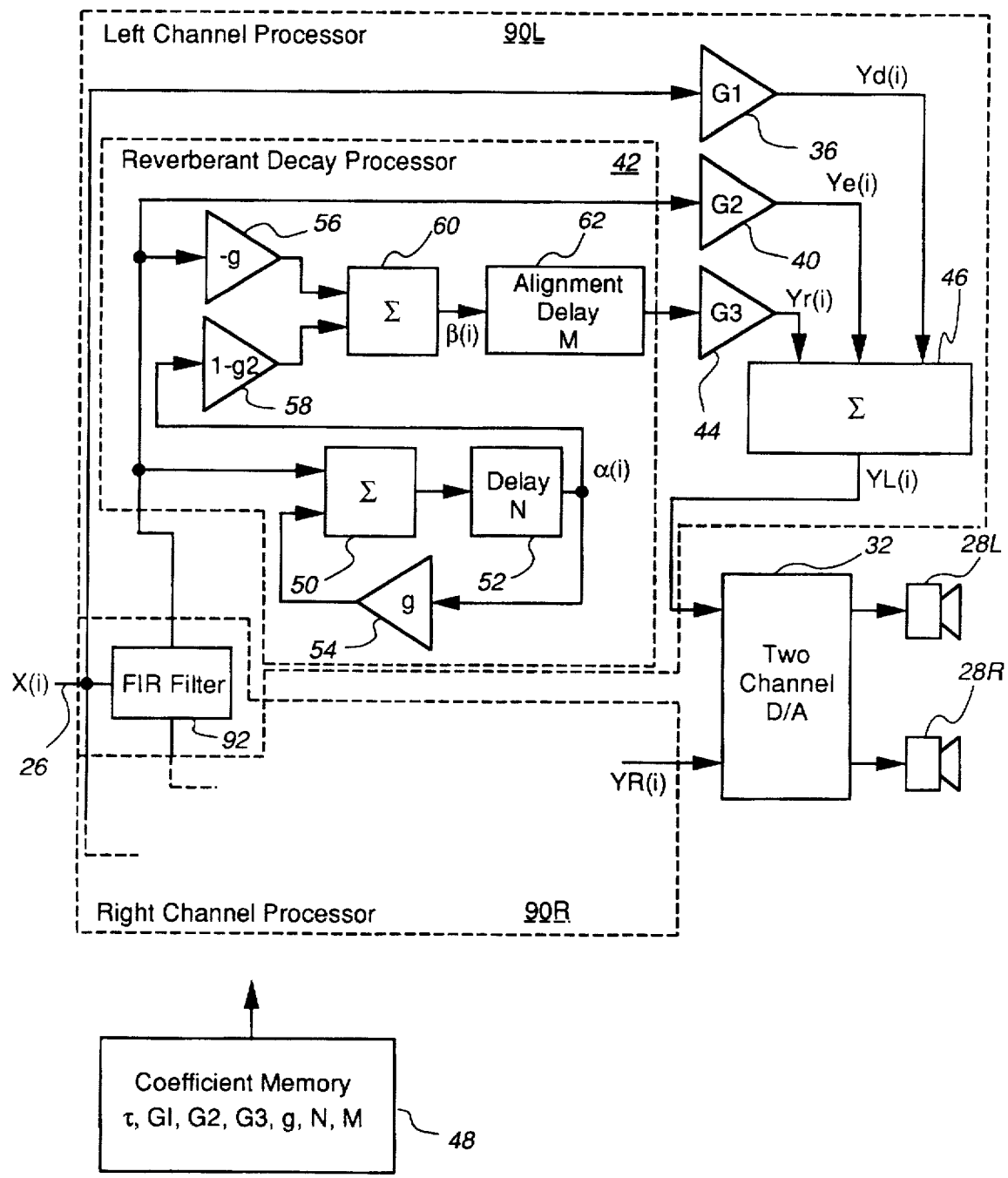
Figure 7:
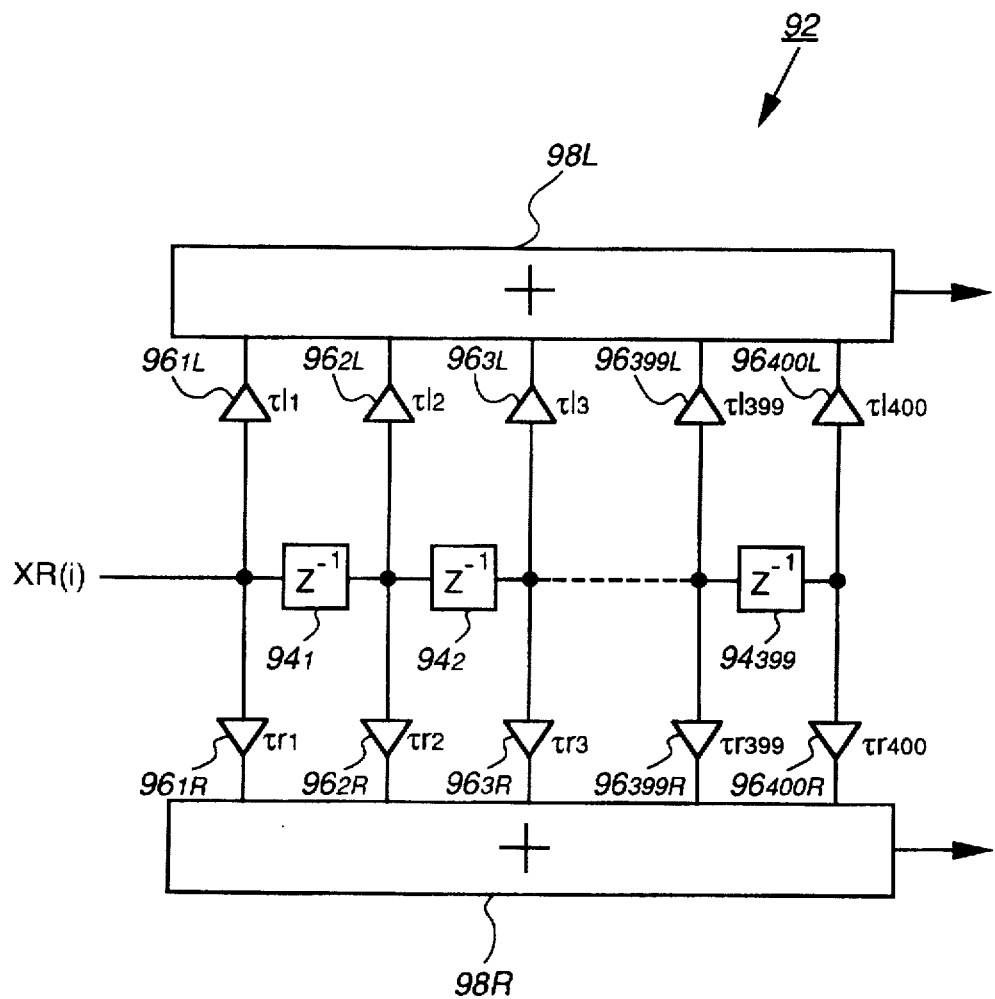

FIG. 6 is a block diagram illustrating another example of the characteristic altering circuit shown in FIG. 1; and FIG. 7 is a block diagram of the FIR (finite impulse response) filter shown in FIG. 6.

DETAILED DESCRIPTION

Referring to FIG. 1. the telephone instrument is connected to a telephone line 10 which is connected to a switching facility. for example, a central office or PBX (not shown). The telephone instrument has a coupling circuit 12 which is connected to a receiver circuit 14 via a receiver line 16 and to a transmitter circuit 18 via a transmitter line 20. The receiver circuit 14 has an analog-digital (A/D) converter 22 which is connected to the receiver line 16 and a characteristic altering circuit 24 which is connected to the A/D converter 22 via a digital signal line 26. The characteristic altering circuit 24 is connected to a pair of left and right earphones 28L and 28R, in one example a telephone operator's handset. A microphone 30 is connected to the transmitter circuit 18. As is conventional, the coupling circuit 12 performs a hybrid circuit function which includes receiving voice band signals from the telephone line 10 and transmitting voice band signals to the telephone line 10.

Figure 2:
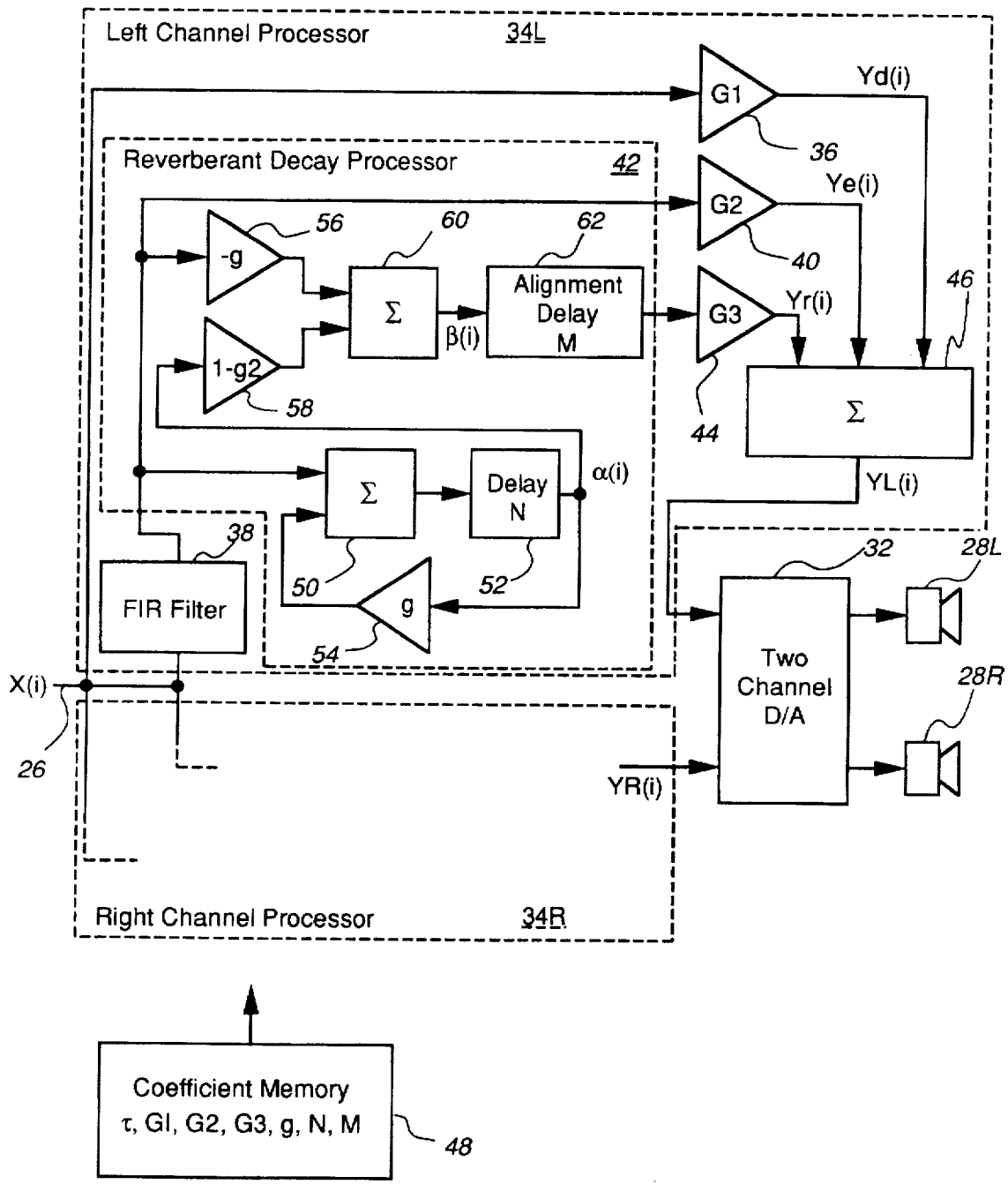
FIG. 2 is a block diagram illustrating an example of the characteristic altering circuit shown in FIG. 1.

Referring to FIG. 2. the characteristic altering circuit 24 has a two channel digital-analog (D/A) converter 32 which is connected to the left and right earphones 28L and 28R. The characteristic altering circuit 24 has a left channel processor 34L and a right channel processor 34R.

The left channel processor 34L processes signals on three paths of the left channel: a direct path, an early reflect path and a reverberation path. The direct path is formed by an amplifier 36 which has a direct path gain coefficient G1. The early reflect path is formed by a series-connected finite impulse response (FIR) filter 38 and an amplifier 40 which has an early reflection path gain coefficient G2. The reverberation path is formed by the FIR filter 38, a reverberant decay processor 42 and an amplifier 44 which has a reverberation path gain coefficient G3. The outputs of the three paths are connected to a summer 46 which is connected to the two channel D/A converter 32. The FIR filter 38 is a 420-tap FIR filter which has filter coefficients $\tau_1 - \tau_{400}$. The coefficients $\tau_1 - \tau_{400}$ correspond to the 0–50 ms segment of a measured room impulse response which is sampled at 8 kHz.

The right channel processor 34R has the same structure as the left channel processor 34L and a detailed circuit is not shown.

The telephone instrument has a coefficient memory 48 which stores a plurality of sets of coefficient parameters: i.e., the FIR filter coefficients $\tau_1 - \tau_{400}$, the gain coefficients G1, G2 and G3 and delay coefficients M and N. The coefficient memory 48 is a volatile memory such as an SRAM and EPROM.

The reverberant decay processor 42 is well known; e.g., M. R. Schroeder teaches such a processor in the Journal of the Audio Engineering Society, Vol.10, p. 219 (July 1962). The reverberant decay processor 42 consists of a summation element 50, a delay element 52, an amplifying elements 54, 56 and 58, a summation element 60 and an alignment delay element 62. The amplifying elements 54, 56 and 58 have gain coefficients g, -g and $1-g^2$, respectively. The delay elements 52 and 62 delay the sample signals by N and M samples, respectively.

The reverberant decay processor 42 may be formed by a digital signal processor, e.g., Motorola DSP56156-60. One set of the amplifiers 36, 40 and 44 may be formed by an operational amplifier, e.g., Signetics NE5532A. The A/D converter 22 and the two channel D/A converter 32 may be formed by a multimedia audio codec, e.g., Crystal Semiconductor CS4415.

The telephone instrument shown in FIGS. 1 and 2 receives signals from the telephone line 10 and creates two different signals which are directed to the left and right earphones 28L and 28R. The resultant sound is perceived by the user to have a quality of spatial presents. This is a pleasant improvement as compared to the effect of a simple binaural headset as typically used to receive signals directly from the telephone line.

Figure 3:
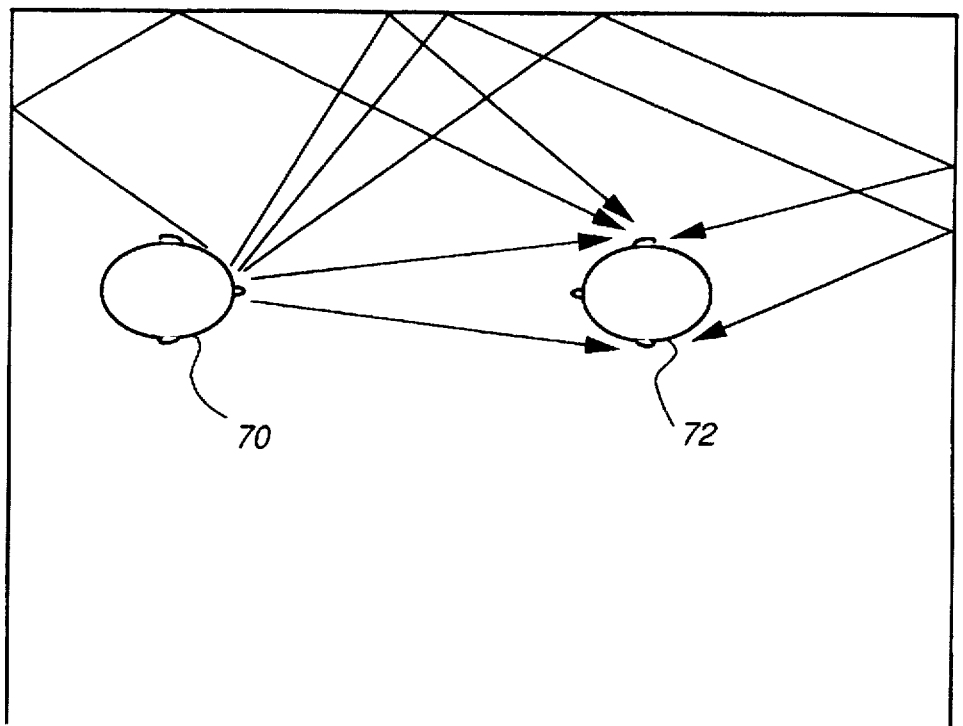
FIG. 3 illustrates a typical talking and listening environment.

To understand the spatial simulation, a simulated listening environment is described referring to FIG. 3. In this model, a talker 70 is located in front of a listener 72 in an acoustically pleasant environment. The voice sounds from the talker 70 arrive at the ears of the listener 72 via many paths: a direct path and wall reflection paths.

Figure 4:
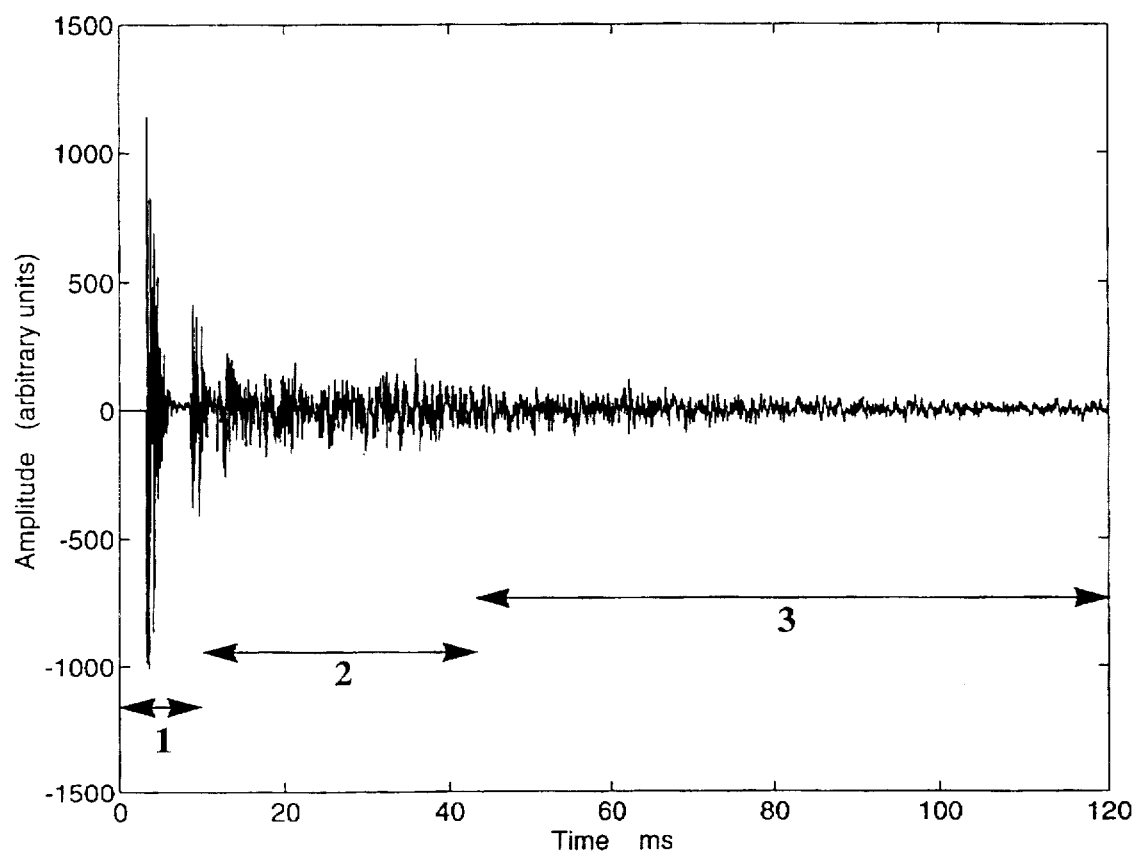
FIG. 4 shows an example of a measured impulse response between a listener's ear and a sound source (a talker) in front of the listener in an acoustically "pleasant" listening environment.

FIG. 4 shows a measurement of the impulse response of an acoustic transmission path to a single ear in a pleasant listening environment. The impulse response may be considered to have three major components in time: (1) direct transmission components, (2) early reflection transmission components, and (3) random transmission components. The direct transmission components are the sound which arrives by the shortest (i.e., direct) transmission path during a time period of 0–9 ms. The early reflection transmission components are the sound which arrives after reflection from nearby wall surfaces and objects in the room during a time period of 10–50 ms. The random transmission components are the sound which arrives after essentially random reflection after a time of 50 ms and the amplitudes of the components are exponentially decaying. The three components may be called the direct sound, the early reflection sound, and the reverberant decay sound. These components are different as perceived at the left and right ear of a listener and provide indication to the listener as to the relative physical location of the source of the sound.

Figure 5:
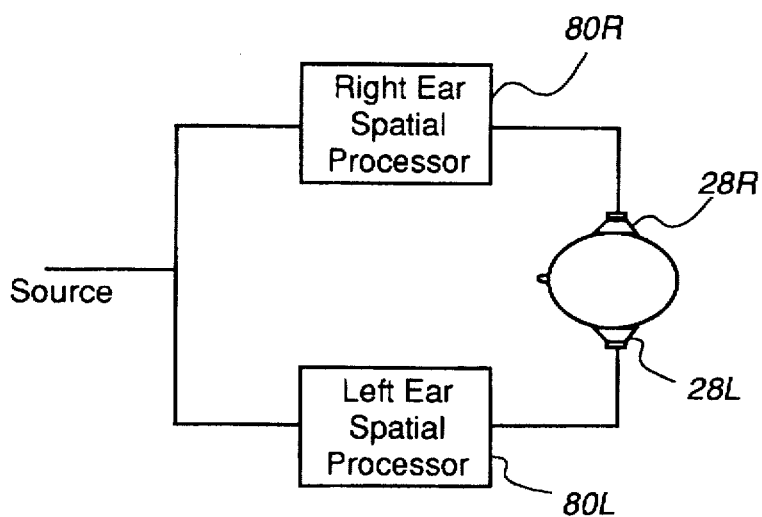
FIG. 5 shows spatial processing as applied to a telephone voice signal for simulating the "pleasant" listening environment.

FIG. 5 shows spatial processing as re-creation of real listening environment. There are a pair of left and right ear spatial processors 80L and 80R for a pair of the left and right earphones 28L and 28R. The spatial processors 80L and 80R are formed by the characteristic altering circuit 24 shown in FIGS. 1 and 2.

The telephone instrument shown in FIGS. 1 and 2 obtains spatial simulation similar in quality to more computationally intensive methods by modelling the three basic components of the room impulse response. The direct sound is represented by an unprocessed audio signal. The early reflection sound is represented by the signal through an FIR filter during a time period of about 50 ms. The reverberant decay sound is represented by the signal through an all-pass filter and a delay line after the early reflection. The three sounds are then summed together, with different weights.

Operation of the telephone instrument shown in FIGS. 1 and 2 is now described. The FIR filter coefficients $\tau_1 - \tau_{400}$, the gain coefficients G1, G2, G3 and g and delay coefficients M and N are supplied as variable parameters by the coefficient memory 48 to the respective FIR filters, amplifiers, amplifying elements and delay elements of the characteristic altering circuit 24.

In this embodiment, the parameters of coefficients of the left channel are different from that of the right channel to create the spatial impression for the listener. Examples of the FIR filter coefficients $\tau_1 - \tau_{400}$ are listed in the attached Table I. Examples of other parameters are as follows:

| Parameter | Left Channel | Right Channel |
|---|---|---|
| G1 | 0.20 | 0.22 |
| G2 | 0.74 | 0.73 |
| G3 | 0.06 | 0.05 |
| g | 0.56 | 0.52 |
| N | 104 | 112 |
| M | 453 | 417 |

The coupling circuit 12 provides the receiver line 16 with received analog voice band signals which in turn are converted to digital signals by the A/D converter 22. The A/D converter 22 samples the analog signals at an 8 kHz rate and quantizes the samples linearly in a digital coded format. The digital signal samples X(i) are provided on the digital signal line 26. The samples X(i) are altered by the characteristic altering circuit 24 to provide signals for the left and right earphones 28L and 28R. In each channel processor, the sample X(i) is processed via the three paths: the direct path, the early reflect path and reverberation path.

In the direct path, the samples X(i) are simply multiplied by the amplifier 36. The output Yd(i) of the direct path is given by:

$$Yd(i) = G1 \cdot X(i)$$

In the early reflection path, the samples X(i) are filtered by the FIR filter 38 having 420 taps of the coefficients $\tau_1-\tau_{400}$. The output sample is then multiplied by the amplifier 40. The output Ye(i) of the early reflections path is given by:

$$Ye(i) = G2 \cdot \left( \sum_{k=1}^{400} C(k) X(i-k) \right)$$

where C(k) represents a sequence of FIR filter coefficients $\tau_1-\tau_{400}$.

In the reverberant path, the output sample is processed by the reverberant decay processor 42, the output of which is an exponentially decreasing scaled, delayed version of past input samples. The current output sample of the FIR filter 38 is delayed by the delay element 52 and the alignment delay element 62 by N and M samples relative to the direct sound. The delayed output of the reverberant decay processor 42 is multiplied by the amplifier 44. The output Yr(i) of the reverberant decay path is:

$$Yr(i) = G3 \cdot \beta(i-M)$$

where $$\beta(i) = (-g) \cdot X(i) + (1-g^2) \cdot \alpha(i-N)$$

where $$\alpha(i) = X(i) + g \cdot \alpha(i-N)$$

The three path outputs are summed by the summer 46. The output sample YL(i) or YR(i) of the left or right channel is given by:

$$YL(i) \text{ or } YR(i) = Yd(i) + Ye(i) + Yr(i)$$

The output samples YL(i) and YR(i) are separately converted to analog signals by the two channel D/A converter 32. The converted left and right signals are supplied to the left and right earphones 28L and 28R of the headset. The telephone operator or attendant is provided with spatially simulated signals as could be normal in an acoustically pleasant environment.

FIG. 6 shows another example of the characteristic altering circuit which includes a left channel processor 90L and a right channel processor 90R. The left and right channel processor 90L and 90R share a common FIR filter 92. The detail of the FIR filters 92 is shown in FIG. 7.

Referring to FIG. 7, the FIR filter 92 includes a common 400-tap delay line which has 399 series-connected delay elements $94_1-94_{399}$. The 400 taps of the delay elements $94_1-94_{399}$ are connected to two sets of 400 multipliers $96_{1L}-96_{400L}$ and $96_{1R}-96_{400R}$. The outputs of the multipliers $96_{1L}-96_{400L}$ are connected to a summer 98L and the outputs of the multipliers $96_{1R}-96_{400R}$ are connected to a summer 98R. The coefficients $\tau l_1-\tau l_{400}$ for the multipliers $96_{1L}-96_{400L}$ and the coefficients $\tau r_1-\tau r_{400}$ for the multipliers $96_{1R}-96_{400R}$ are provided by the coefficient memory 48 shown in FIG. 8.

The summed output signal from the summer 98L is provided to the amplifier 40 and the reverberant decay processor 42 in the left channel processor 90L. The summed output signal from the summer 98R is provided to the right channel processor 90R. Other operation is identical to that of the characteristic altering circuit shown in FIG. 2. In this example, in the FIR filter 92, the 400-tap delay line of 399 series-connected delay elements $94_1-94_{399}$ is common to both channels and the delay line and its related circuits are simple and less complicate.

In one example, the coefficient parameters are altered from one telephone call to another to provide some variation in the spatial presents conveyed to the telephone operator or attendant. The coefficient memory 48 can be provided with two or more sets of coefficients for this purpose.

| Co-Efficient Number | Left Channel FIR | Right Channel FIR |
|---|---|---|
| 1 | 0.00 E + 00 | 0.00 E + 00 |
| 2 | 0.00 E + 00 | 0.00 E + 00 |
| 3 | 0.00 E + 00 | 0.00 E + 00 |
| 4 | 0.00 E + 00 | 0.00 E + 00 |
| 5 | 0.00 E + 00 | 0.00 E + 00 |
| 6 | 0.00 E + 00 | 0.00 E + 00 |
| 7 | 0.00 E + 00 | 0.00 E + 00 |
| 8 | 0.00 E + 00 | 0.00 E + 00 |
| 9 | 0.00 E + 00 | 0.00 E + 00 |
| 10 | 0.00 E + 00 | 0.00 E + 00 |
| 11 | 0.00 E + 00 | 0.00 E + 00 |
| 12 | 0.00 E + 00 | 0.00 E + 00 |
| 13 | 0.00 E + 00 | 0.00 E + 00 |
| 14 | 0.00 E + 00 | 0.00 E + 00 |
| 15 | 0.00 E + 00 | 0.00 E + 00 |
| 16 | 0.00 E + 00 | 0.00 E + 00 |
| 17 | 0.00 E + 00 | 0.00 E + 00 |
| 18 | 0.00 E + 00 | 0.00 E + 00 |
| 19 | 0.00 E + 00 | 0.00 E + 00 |
| 20 | 0.00 E + 00 | 0.00 E + 00 |
| 21 | 0.00 E + 00 | 0.00 E + 00 |
| 22 | 0.00 E + 00 | 1.93 E + 03 |
| 23 | 0.00 E + 00 | −3.82 E + 03 |
| 24 | 3.14 E + 03 | 6.01 E + 03 |
| 25 | −4.74 E + 03 | −1.66 E + 04 |
| 26 | −2.21 E + 04 | −9.48 E + 03 |
| 27 | 1.30 E + 04 | 1.68 E + 04 |
| 28 | 1.16 E + 04 | 5.96 E + 03 |
| 29 | 3.93 E + 03 | 3.81 E + 03 |
| 30 | 4.08 E + 02 | −1.84 E + 03 |
| 31 | −9.15 E + 02 | 5.55 E + 02 |
| 32 | −6.10 E + 01 | −1.25 E + 03 |
| 33 | −3.59 E + 02 | 1.37 E + 03 |
| 34 | 1.83 E + 03 | 4.57 E + 02 |
| 35 | −1.26 E + 02 | 1.07 E + 03 |
| 36 | 1.92 E + 03 | 9.75 E + 02 |
| 37 | −6.74 E + 02 | 0.00 E + 00 |
| 38 | 1.55 E + 03 | 5.33 E + 02 |
| 39 | −1.13 E + 03 | −5.02 E + 02 |

-continued

| Co-Efficient Number | Left Channel FIR | Right Channel FIR |
|---|---|---|
| 40 | −1.76 E + 02 | 3.09 E + 02 |
| 41 | −1.54 E + 03 | −2.59 E + 02 |
| 42 | 1.40 E + 01 | 8.99 E + 02 |
| 43 | 7.60 E + 02 | −1.14 E + 03 |
| 44 | −9.00 E + 00 | −2.22 E + 02 |
| 45 | 2.21 E + 02 | −1.94 E + 03 |
| 46 | −8.85 E + 02 | −1.24 E + 03 |
| 47 | −3.77 E + 02 | −2.99 E + 02 |
| 48 | −5.45 E + 02 | −1.69 E + 02 |
| 49 | −1.59 E + 03 | −1.62 E + 02 |
| 50 | −1.11 E + 03 | 3.60 E + 01 |
| 51 | 1.68 E + 02 | −3.42 E + 02 |
| 52 | −9.82 E + 02 | −2.27 E + 02 |
| 53 | 5.41 E + 02 | −3.26 E + 02 |
| 54 | −1.35 E + 03 | 3.00 E + 00 |
| 55 | −1.54 E + 03 | −3.68 E + 02 |
| 56 | −4.87 E + 02 | −1.24 E + 03 |
| 57 | −1.12 E + 03 | −1.08 E + 03 |
| 58 | 8.61 E + 02 | 3.73 E + 02 |
| 59 | 2.30 E + 03 | 1.22 E + 03 |
| 60 | 1.20 E + 01 | −1.14 E + 03 |
| 61 | 1.12 E + 03 | 2.28 E + 03 |
| 62 | 7.46 E + 02 | −1.26 E + 02 |
| 63 | 1.81 E + 02 | 3.48 E + 02 |
| 64 | 1.02 E + 03 | −1.40 E + 03 |
| 65 | −1.03 E + 03 | −2.00 E + 03 |
| 66 | 2.30 E + 01 | 3.74 E + 03 |
| 67 | 2.74 E + 02 | 4.36 E + 02 |
| 68 | 7.73 E + 02 | 3.09 E + 02 |
| 69 | −1.42 E + 03 | 4.12 E + 02 |
| 70 | −3.50 E + 01 | −4.74 E + 02 |
| 71 | 1.84 E + 03 | −1.11 E + 02 |
| 72 | −7.08 E + 02 | −4.40 E + 01 |
| 73 | −1.43 E + 03 | −6.70 E + 01 |
| 74 | −4.28 E + 02 | 1.50 E + 02 |
| 75 | 2.76 E + 02 | −7.51 E + 02 |
| 76 | 5.90 E + 01 | −2.14 E + 02 |
| 77 | 6.86 E + 02 | −1.28 E + 02 |
| 78 | −2.00 E + 00 | −9.40 E + 02 |
| 79 | −2.64 E + 02 | 7.17 E + 02 |
| 80 | −3.27 E + 02 | 2.08 E + 02 |
| 81 | 2.21 E + 02 | −7.12 E + 02 |
| 82 | 1.23 E + 02 | 5.25 E + 02 |
| 83 | 1.74 E + 02 | 2.82 E + 02 |
| 84 | −9.94 E + 02 | 5.11 E + 02 |
| 85 | 7.64 E + 02 | 9.96 E + 02 |
| 86 | 6.58 E + 02 | −8.54 E + 02 |
| 87 | −4.49 E + 02 | 2.68 E + 02 |
| 88 | −4.50 E + 01 | −3.92 E + 02 |
| 89 | −1.59 E + 02 | −8.58 E + 02 |
| 90 | −5.65 E + 02 | 4.70 E + 01 |
| 91 | −7.25 E + 02 | −1.18 E + 02 |
| 92 | 6.95 E + 02 | 1.10 E + 02 |
| 93 | −1.39 E + 02 | 5.30 E + 02 |
| 94 | 8.01 E + 02 | 3.20 E + 02 |
| 95 | −2.61 E + 02 | 6.35 E + 02 |
| 96 | 1.65 E + 03 | 5.07 E + 02 |
| 97 | −9.71 E + 02 | −9.08 E + 02 |
| 98 | −3.00 E + 02 | 9.91 E + 02 |
| 99 | 1.41 E + 03 | 1.81 E + 02 |
| 100 | −1.23 E + 03 | −1.21 E + 03 |
| 101 | −2.87 E + 02 | −6.01 E + 02 |
| 102 | −2.70 E + 01 | −3.30 E + 02 |
| 103 | 1.26 E + 03 | 3.82 E + 02 |
| 104 | 5.89 E + 02 | 1.01 E + 02 |
| 105 | −3.97 E + 02 | −4.00 E + 01 |
| 106 | −2.47 E + 03 | −2.75 E + 02 |
| 107 | −1.43 E + 02 | −1.35 E + 03 |
| 108 | −4.81 E + 02 | 2.04 E + 02 |
| 109 | 8.51 E + 02 | 1.45 E + 03 |
| 110 | 9.92 E + 02 | 8.44 E + 02 |
| 111 | −3.62 E + 02 | 5.39 E + 02 |
| 112 | 3.73 E + 02 | −5.48 E + 02 |
| 113 | −3.20 E + 01 | 1.49 E + 02 |
| 114 | 1.57 E + 03 | 3.39 E + 02 |
| 115 | 4.02 E + 02 | 4.94 E + 02 |
| 116 | 4.32 E + 02 | 4.52 E + 02 |
| 117 | −1.97 E + 02 | 1.30 E + 01 |
| 118 | 6.67 E + 02 | −4.90 E + 01 |
| 119 | −8.17 E + 02 | 2.08 E + 02 |
| 120 | −8.45 E + 02 | 2.71 E + 02 |
| 121 | 3.00 E + 00 | −4.73 E + 02 |
| 122 | −2.84 E + 02 | −2.89 E + 02 |
| 123 | −1.50 E + 02 | −5.77 E + 02 |
| 124 | 9.50 E + 01 | −2.64 E + 02 |
| 125 | 8.26 E + 02 | 2.05 E + 02 |
| 126 | −1.57 E + 02 | −1.47 E + 02 |
| 127 | 4.40 E + 01 | 4.30 E + 02 |
| 128 | −5.19 E + 02 | 1.20 E + 01 |
| 129 | −6.60 E + 01 | −3.50 E + 02 |
| 130 | −2.15 E + 02 | 5.10 E + 01 |
| 131 | 2.06 E + 02 | −2.55 E + 02 |
| 132 | −5.60 E + 02 | 8.40 E + 01 |
| 133 | 1.92 E + 02 | −8.74 E + 02 |
| 134 | −5.55 E + 02 | 2.24 E + 02 |
| 135 | 5.42 E + 02 | 7.54 E + 02 |
| 136 | −1.76 E + 02 | −5.09 E + 02 |
| 137 | −7.58 E + 02 | 7.74 E + 02 |
| 138 | 9.28 E + 02 | 1.07 E + 03 |
| 139 | −1.00 E + 03 | 2.39 E + 02 |
| 140 | 1.92 E + 03 | 4.21 E + 02 |
| 141 | −5.02 E + 02 | −5.83 E + 02 |
| 142 | 2.37 E + 02 | −4.67 E + 02 |
| 143 | 2.34 E + 02 | 1.79 E + 02 |
| 144 | −2.61 E + 02 | −4.68 E + 02 |
| 145 | 3.70 E + 02 | 3.37 E + 02 |
| 146 | −4.83 E + 02 | 1.80 E + 01 |
| 147 | 2.00 E + 03 | 1.23 E + 03 |
| 148 | 8.58 E + 02 | 9.55 E + 02 |
| 149 | −5.00 E + 01 | −1.11 E + 03 |
| 150 | −4.51 E + 02 | −5.87 E + 02 |
| 151 | 1.12 E + 02 | −4.02 E + 02 |
| 152 | −7.66 E + 02 | −8.05 E + 62 |
| 153 | 3.58 E + 02 | 4.70 E + 01 |
| 154 | 1.81 E + 03 | −8.00 E + 00 |
| 155 | −2.00 E + 01 | 4.83 E + 02 |
| 156 | −1.00 E + 03 | 3.24 E + 02 |
| 157 | −1.05 E + 03 | −6.51 E + 02 |
| 158 | 2.42 E + 02 | 2.93 E + 02 |
| 159 | 4.28 E + 02 | −1.16 E + 02 |
| 160 | −1.91 E + 02 | −3.50 E + 01 |
| 161 | −5.25 E + 02 | −7.50 E + 01 |
| 162 | −7.40 E + 02 | 2.35 E + 02 |
| 163 | 1.69 E + 02 | 6.09 E + 02 |
| 164 | −1.26 E + 02 | 1.86 E + 02 |
| 165 | 5.56 E + 02 | −7.22 E + 02 |
| 166 | 5.13 E + 02 | −6.87 E + 02 |
| 167 | −1.87 E + 02 | 4.70 E + 01 |
| 168 | −5.04 E + 02 | 3.34 E + 02 |
| 169 | 4.15 E + 02 | 2.16 E + 02 |
| 170 | 1.12 E + 03 | −9.10 E + 01 |
| 171 | −8.30 E + 01 | 4.77 E + 02 |
| 172 | −4.01 E + 02 | 2.71 E + 02 |
| 173 | −2.23 E + 02 | −3.40 E + 01 |
| 174 | 4.79 E + 02 | 1.74 E + 02 |
| 175 | −4.40 E + 02 | 2.51 E + 02 |
| 176 | −1.18 E + 02 | −2.26 E + 02 |
| 177 | 4.50 E + 01 | 1.91 E + 02 |
| 178 | 2.88 E + 02 | −4.00 E + 00 |
| 179 | 2.14 E + 02 | 3.82 E + 02 |
| 180 | −2.30 E + 02 | 1.72 E + 02 |
| 181 | −4.43 E + 02 | −4.39 E + 02 |
| 182 | 1.50 E + 01 | −5.62 E + 02 |
| 183 | −3.60 E + 01 | −9.51 E + 02 |
| 184 | −8.00 E + 02 | 5.18 E + 02 |
| 185 | −2.29 E + 02 | 1.65 E + 02 |
| 186 | −3.79 E + 02 | −1.71 E + 02 |
| 187 | 2.87 E + 02 | −3.47 E + 02 |
| 188 | 3.48 E + 02 | 3.10 E + 02 |
| 189 | −9.00 E + 00 | 1.82 E + 02 |
| 190 | 5.00 E + 01 | −6.58 E + 02 |
| 191 | −4.69 E + 02 | −7.30 E + 01 |
| 192 | −7.19 E + 02 | −2.78 E + 02 |
| 193 | 2.15 E + 02 | −1.42 E + 02 |
| 194 | −3.67 E + 02 | 2.20 E + 01 |
| 195 | −3.64 E + 02 | 2.01 E + 02 |

-continued

| Co-Efficient Number | Left Channel FIR | Right Channel FIR |
| --- | --- | --- |
| 196 | 5.97 E + 02 | −2.88 E + 02 |
| 197 | 2.51 E + 02 | −1.16 E + 02 |
| 198 | −3.34 E + 02 | −1.41 E + 02 |
| 199 | −5.80 E + 01 | 2.22 E + 02 |
| 200 | 1.34 E + 03 | 4.24 E + 02 |
| 201 | 1.15 E + 03 | 1.91 E + 02 |
| 202 | 2.79 E + 02 | −1.32 E + 02 |
| 203 | −2.30 E + 01 | 3.02 E + 02 |
| 204 | −7.49 E + 02 | 2.28 E + 02 |
| 205 | −1.80 E + 02 | 4.25 E + 02 |
| 206 | −2.85 E + 02 | −3.70 E + 01 |
| 207 | −7.66 E + 02 | −1.54 E + 03 |
| 208 | 6.18 E + 02 | 1.05 E + 03 |
| 209 | 2.06 E + 02 | 4.26 E + 02 |
| 210 | −2.50 E + 01 | 7.50 E + 01 |
| 211 | 3.02 E + 02 | 3.29 E + 02 |
| 212 | 1.04 E + 02 | −2.01 E + 02 |
| 213 | 1.39 E + 02 | 1.68 E + 02 |
| 214 | −3.72 E + 02 | −7.47 E + 02 |
| 215 | −2.00 E + 02 | 9.40 E + 01 |
| 216 | −5.14 E + 02 | −2.13 E + 02 |
| 217 | −3.63 E + 02 | −1.63 E + 02 |
| 218 | 3.68 E + 02 | 1.98 E + 02 |
| 219 | 1.06 E + 02 | −1.07 E + 02 |
| 220 | 1.10 E + 01 | 3.51 E + 02 |
| 221 | −5.25 E + 02 | 2.68 E + 02 |
| 222 | −3.67 E + 02 | 1.50 E + 02 |
| 223 | 3.25 E + 02 | −1.77 E + 02 |
| 224 | 9.30 E + 02 | 1.60 E + 01 |
| 225 | 3.33 E + 02 | 2.37 E + 02 |
| 226 | 2.83 E + 02 | −3.11 E + 02 |
| 227 | 2.56 E + 02 | −7.10 E + 01 |
| 228 | −4.01 E + 02 | −5.70 E + 01 |
| 229 | −6.59 E + 02 | −3.02 E + 02 |
| 230 | −5.28 E + 02 | 2.08 E + 02 |
| 231 | 4.93 E + 02 | 4.41 E + 02 |
| 232 | −3.52 E + 02 | 2.75 E + 02 |
| 233 | 1.71 E + 02 | −1.12 E + 02 |
| 234 | 5.60 E + 02 | −4.33 E + 02 |
| 235 | 3.01 E + 02 | 9.50 E + 01 |
| 236 | 3.41 E + 02 | 4.40 E + 02 |
| 237 | −1.89 E + 02 | 3.59 E + 02 |
| 238 | −8.29 E + 02 | −1.27 E + 02 |
| 239 | −4.90 E + 02 | −1.69 E + 02 |
| 240 | 2.51 E + 02 | −1.06 E + 02 |
| 241 | 7.86 E + 02 | −9.00 E + 01 |
| 242 | 8.01 E + 02 | −3.33 E + 02 |
| 243 | −7.70 E + 01 | −6.51 E + 02 |
| 244 | −3.99 E + 02 | 3.77 E + 02 |
| 245 | −7.45 E + 02 | 8.24 E + 02 |
| 246 | 2.61 E + 02 | 6.09 E + 02 |
| 247 | −1.13 E + 02 | 2.04 E + 02 |
| 248 | 1.42 E + 02 | −3.51 E + 02 |
| 249 | 7.01 E + 02 | −6.65 E + 02 |
| 250 | 5.39 E + 02 | 1.00 E + 01 |
| 251 | −6.90 E + 01 | 1.14 E + 02 |
| 252 | −1.02 E + 03 | −2.24 E + 02 |
| 253 | −5.24 E + 02 | 5.06 E + 02 |
| 254 | −1.20 E + 01 | 6.21 E + 02 |
| 255 | 6.41 E + 02 | 2.95 E + 02 |
| 256 | 3.75 E + 02 | −2.45 E + 02 |
| 257 | 1.68 E + 02 | −3.81 E + 02 |
| 258 | 3.40 E + 01 | 1.39 E + 02 |
| 259 | 9.00 E + 00 | −1.07 E + 02 |
| 260 | 2.76 E + 02 | 8.40 E + 01 |
| 261 | 1.73 E + 02 | −8.20 E + 01 |
| 262 | 1.81 E + 02 | 2.43 E + 02 |
| 263 | 1.32 E + 02 | 1.39 E + 02 |
| 264 | −2.29 E + 02 | −3.26 E + 02 |
| 265 | −2.22 E + 02 | 2.98 E + 02 |
| 266 | 7.20 E + 01 | −4.19 E + 02 |
| 267 | 6.39 E + 02 | −3.33 E + 02 |
| 268 | −4.40 E + 02 | −2.04 E + 02 |
| 269 | −9.76 E + 02 | 3.64 E + 02 |
| 270 | 4.21 E + 02 | 1.91 E + 02 |
| 271 | −1.46 E + 02 | −8.30 E + 01 |
| 272 | −5.00 E + 00 | 2.99 E + 02 |
| 273 | 3.53 E + 02 | −2.00 E + 01 |
| 274 | −1.67 E + 02 | −1.08 E + 02 |
| 275 | 3.60 E + 01 | 2.54 E + 02 |
| 276 | 1.50 E + 01 | 1.09 E + 02 |
| 277 | 4.20 E + 01 | 1.42 E + 02 |
| 278 | 7.60 E + 01 | 6.16 E + 02 |
| 279 | −1.88 E + 02 | −3.58 E + 02 |
| 280 | −3.67 E + 02 | −4.43 E + 02 |
| 281 | 1.30 E + 02 | −2.81 E + 02 |
| 282 | 5.42 E + 02 | 1.91 E + 02 |
| 283 | 2.51 E + 02 | −2.61 E + 02 |
| 284 | −3.20 E + 01 | 1.32 E + 02 |
| 285 | 4.07 E + 02 | 3.95 E + 02 |
| 286 | 6.15 E + 02 | 2.48 E + 02 |
| 287 | −3.99 E + 02 | −8.40 E + 01 |
| 288 | −4.30 E + 02 | −5.40 E + 02 |
| 289 | −2.42 E + 02 | 1.24 E + 02 |
| 290 | −3.54 E + 02 | 3.20 E + 01 |
| 291 | −1.79 E + 02 | 3.81 E + 02 |
| 292 | 5.20 E + 01 | −5.89 E + 02 |
| 293 | 5.16 E + 02 | 4.90 E + 01 |
| 294 | 1.50 E + 01 | 6.70 E + 01 |
| 295 | 9.10 E + 01 | −2.31 E + 02 |
| 296 | 3.02 E + 02 | 3.12 E + 02 |
| 297 | −1.28 E + 02 | −9.20 E + 01 |
| 298 | −3.87 E + 02 | 2.42 E + 02 |
| 299 | 1.70 E + 01 | −1.24 E + 02 |
| 300 | 2.83 E + 02 | 2.15 E + 02 |
| 301 | 3.76 E + 02 | 4.29 E + 02 |
| 302 | 4.52 E + 02 | −1.76 E + 02 |
| 303 | −3.15 E + 02 | 8.00 E + 01 |
| 304 | −3.87 E + 02 | 1.23 E + 02 |
| 305 | −2.77 E + 02 | −1.63 E + 02 |
| 306 | −3.07 E + 02 | −1.39 E + 02 |
| 307 | −4.70 E + 01 | −1.37 E + 02 |
| 308 | 3.24 E + 02 | −1.08 E + 02 |
| 309 | 6.00 E + 00 | −1.50 E + 01 |
| 310 | −2.30 E + 02 | −6.50 E + 01 |
| 311 | −2.17 E + 02 | −9.30 E + 01 |
| 312 | 1.40 E + 02 | 2.65 E + 02 |
| 313 | 3.99 E + 02 | 3.80 E + 01 |
| 314 | −3.60 E + 01 | 4.28 E + 02 |
| 315 | 1.19 E + 02 | 2.00 E + 01 |
| 316 | −6.60 E + 01 | −2.83 E + 02 |
| 317 | 2.19 E + 02 | 4.55 E + 02 |
| 318 | 1.36 E + 02 | −1.09 E + 02 |
| 319 | −5.30 E + 01 | 2.32 E + 02 |
| 320 | 4.10 E + 01 | 5.54 E + 02 |
| 321 | −1.62 E + 02 | 1.20 E + 01 |
| 322 | −1.30 E + 01 | −3.64 E + 02 |
| 323 | −4.40 E + 01 | −2.88 E + 02 |
| 324 | 4.22 E + 02 | −6.90 E + 01 |
| 325 | 2.91 E + 02 | −1.31 E + 02 |
| 326 | −8.00 E + 00 | 2.31 E + 02 |
| 327 | 1.91 E + 02 | 2.61 E + 02 |
| 328 | −2.02 E + 02 | −2.25 E + 02 |
| 329 | −5.55 E + 02 | −6.60 E + 01 |
| 330 | −1.87 E + 02 | 2.63 E + 02 |
| 331 | −4.36 E + 02 | 2.30 E + 01 |
| 332 | 2.80 E + 01 | −3.43 E + 02 |
| 333 | 2.44 E + 02 | −3.34 E + 02 |
| 334 | −1.66 E + 02 | −1.72 E + 02 |
| 335 | −1.00 E + 01 | −2.80 E + 01 |
| 336 | −3.75 E + 02 | 2.19 E + 02 |
| 337 | 1.78 E + 02 | 5.30 E + 01 |
| 338 | −1.47 E + 02 | 1.21 E + 02 |
| 339 | 1.81 E + 02 | −6.20 E + 01 |
| 340 | 1.55 E + 02 | −1.68 E + 02 |
| 341 | 9.30 E + 01 | 2.08 E + 02 |
| 342 | 7.50 E + 01 | 3.10 E + 02 |
| 343 | −1.59 E + 02 | 6.50 E + 02 |
| 344 | 6.55 E + 02 | 2.91 E + 02 |
| 345 | 7.37 E + 02 | −5.50 E + 01 |
| 346 | 7.30 E + 02 | −2.70 E + 01 |
| 347 | 6.60 E + 01 | 1.70 E + 01 |
| 348 | −1.32 E + 02 | 3.14 E + 02 |
| 349 | −3.79 E + 02 | 1.28 E + 02 |
| 350 | 6.10 E + 01 | 0.00 E + 00 |
| 351 | −5.00 E + 01 | 2.30 E + 01 |

-continued

| Co-Efficient Number | Left Channel FIR | Right Channel FIR |
|---|---|---|
| 352 | −5.00 E + 01 | −6.00 E + 01 |
| 353 | 0.00 E + 00 | 6.00 E + 00 |
| 354 | −3.17 E + 02 | −2.02 E + 02 |
| 355 | −7.80 E + 01 | −3.43 E + 02 |
| 356 | 1.60 E + 01 | −5.65 E + 02 |
| 357 | 3.60 E + 01 | −1.26 E + 02 |
| 358 | 4.51 E + 02 | 4.61 E + 02 |
| 359 | 4.93 E + 02 | 7.49 E + 02 |
| 360 | −4.91 E + 02 | 2.98 E + 02 |
| 361 | −1.15 E + 02 | −1.00 E + 02 |
| 362 | 2.25 E + 02 | −1.23 E + 02 |
| 363 | 3.00 E + 01 | −3.42 E + 02 |
| 364 | −5.52 E + 02 | 2.59 E + 02 |
| 365 | 1.44 E + 02 | −1.72 E + 02 |
| 366 | 4.29 E + 02 | 4.00 E + 00 |
| 367 | 1.69 E + 02 | 2.68 E + 02 |
| 368 | 6.80 E + 01 | 2.94 E + 02 |
| 369 | −3.02 E + 02 | 1.67 E + 02 |
| 370 | −5.60 E + 01 | −1.73 E + 02 |
| 371 | −3.80 E + 01 | −4.51 E + 02 |
| 372 | −2.94 E + 02 | −1.64 E + 02 |
| 373 | −1.27 E + 02 | 3.87 E + 02 |
| 374 | 4.05 E + 02 | −1.71 E + 02 |
| 375 | −4.20 E + 01 | −7.70 E + 01 |
| 376 | 2.63 E + 02 | 2.16 E + 02 |
| 377 | 3.01 E + 02 | 4.10 E + 01 |
| 378 | 6.00 E + 00 | −1.49 E + 02 |
| 379 | −2.24 E + 02 | 2.73 E + 02 |
| 380 | −3.90 E + 01 | 1.92 E + 02 |
| 381 | 4.39 E + 02 | 4.20 E + 01 |
| 382 | 9.50 E + 01 | −2.87 E + 02 |
| 383 | −1.62 E + 02 | 2.08 E + 02 |
| 384 | 2.71 E + 02 | 3.68 E + 02 |
| 385 | 7.60 E + 01 | −1.90 E + 02 |
| 386 | −3.27 E + 02 | 2.26 E + 02 |
| 387 | 4.27 E + 02 | −8.60 E + 01 |
| 388 | 1.70 E + 02 | −1.64 E + 02 |
| 389 | −5.83 E + 02 | 1.81 E + 02 |
| 390 | −6.22 E + 02 | 1.20 E + 01 |
| 391 | 1.09 E + 02 | −4.70 E + 01 |
| 392 | 6.30 E + 02 | −5.00 E + 00 |
| 393 | 1.53 E + 02 | −1.37 E + 02 |
| 394 | 3.70 E + 01 | −8.00 E + 00 |
| 395 | −7.50 E + 01 | −3.40 E + 02 |
| 396 | −4.95 E + 02 | −2.44 E + 02 |
| 397 | −2.13 E + 02 | 1.06 E + 02 |
| 398 | −2.80 E + 01 | −6.90 E + 01 |
| 399 | 4.86 E + 02 | 1.65 E + 02 |
| 400 | 0.00 E + 00 | 0.00 E + 00 |

What is claimed is:

1. A telephone instrument for receiving signals from a telephony apparatus and for transmitting signals to the telephony apparatus via a telephone line, the telephone instrument being for use by a listener having left and right ears, the telephone instrument comprising:

transmitter means;

signal receiving means;

first and second receiver means connected to the signal receiving means, the first and second receiver means for use in acoustical association with the left ear and the right ear, respectively, of the listener;

signal coupling means for coupling signals from the telephone line to the signal receiving means and for coupling signals from the transmitter means to the telephone line;

the signal receiving means comprising:

a first received signal processing means for altering an audible phase characteristic of the received signal, thereby providing a first characteristic altered signal to the first receiver means; and a second received signal processing means for altering an audible phase characteristic of the received signal, thereby providing a second characteristic altered signal to the second receiver means, the audible phase characteristic of the second characteristic altered signal being different than that of the first characteristic altered signal.

2. The telephone instrument of claim 1, wherein each of the first and second received signal processing means comprises signal component processing means in association with each receiver means, the signal component processing means including a direct path processing means and a reverberation means.

3. The telephone instrument of claim 2, wherein the reverberation means comprises a finite impulse processing means and an all-pass signal processing means for processing an output signal from the finite impulse processing means.

4. The telephone instrument of claim 3, further comprising receiving means for providing summed signals for operation of a respective one of the receiver means in response to the output signals from the direct path processing means, the finite impulse processing means and the all-pass signal processing means, so that the signal whose audible phase characteristic was altered is provided to the respective receiver means.

5. A telephone instrument for receiving signals from a telephony apparatus and for transmitting signals to the telephony apparatus via a telephone line, the telephone instrument being for use by a listener having left and right ears, the telephone instrument comprising:

transmitter means;

signal receiving means;

first and second receiver means connected to the signal receiving means, the first and second receiver means for use in acoustical association with the left ear and the right ear, respectively, of the listener;

signal coupling means for coupling signals from the telephone line to the signal receiving means and for coupling signals from the transmitter means to the telephone line;

the signal receiving means comprising:

a first received signal processing means for altering an audible phase characteristic of the received signal X(i), and for providing a first audible phase characteristic altered signal to the first receiver means;

a second received signal processing means for altering an audible phase characteristic of the received signal X(i), and for providing a second audible phase characteristic altered signal to the second receiver means, the audible phase characteristic of the second signal being different than the audible phase characteristic first signal;

the first and second received signal processing means each comprising: a direct path processing means, a finite impulse processing means, and an all-pass signal processing means for processing an output signal from the finite impulse processing means;

an output from the direct path processing means being proportional to the input X(i);

the output from the finite impulse processing means being proportional to $\Sigma C(k) \cdot X(i-k)$; and an output from the all-pass signal processing means being proportional to $\beta(i-M)$, where $\beta(i)=(-g)\cdot X(i)+(1-g^2)\cdot \alpha(i-N)$, and $\alpha(i)=X(i)+g\cdot \alpha(i-N)$, wherein, C(k) represents a sequence of finite impulse response coefficients, g is a gain coefficient, and M and N represent delay coefficients; and summing means for providing summed signals for operation of a respective one of the first and second receiver means in response to the output signals from the direct path processing means, the finite impulse processing means and the all-pass signal processing means.

6. The telephone instrument of claim 5, further comprising means for providing different coefficients to the first and second received signal processing means.

7. The telephone instrument of claim 3, wherein the finite impulse means including a finite impulse response (FIR) filter having a series-connected delay elements and a summer for summing delayed signals by the delay elements.

8. The telephone instrument of claim 7, wherein the series-connected delay elements of the first and second received signal processing means are formed by common delay elements.

9. A method for providing telephony communications with a telephone user, comprising the steps of:

coupling signals of the user's origin from a transmitter means to a telephone line;

receiving signals destined for the user from the telephone line;

altering an audible characteristic of the received signal in accordance with a first predetermined set of coefficients, thereby providing a first altered signal of an audible phase characteristic to a first receiver means;

altering an audible characteristic of the received signal in accordance with a second predetermined set of coefficients, thereby providing a second altered signal of an audible phase characteristic to a second receiver means, the first and second receiver means forming a pair of receiver means, the audible phase characteristic of the second altered signal being at variance with the audible phase characteristic of the first altered signal.

10. A method for providing telephony communications with a telephone user, comprising the steps of:

a) coupling signals of the user's origin from a transmitter means to a telephone line;

b) receiving signals destined for the user from the telephone line;

c) altering an audible characteristic of the received signal in accordance with a first predetermined set of coefficients, thereby providing a first signal of an altered audible phase characteristic to a first receiver means;

d) altering an audible characteristic of the received signal in accordance with a second predetermined set of coefficients, thereby providing a second signal of an altered audible phase characteristic to a second receiver means, the first and second receiver means being a pair of earphone receiver means, the altered audible phase characteristic of the second signal being at variance with respect to the altered phase characteristic of the first signal, wherein each of steps c and d is comprised of signal processing steps of:

e) computing a direct path component by $G1 \cdot X(i)$;

f) computing an early reflection path component by $G2 \cdot \Sigma C(k) \; X(i-k)$, wherein $C(k)$ represents the sequence of finite impulse response coefficients; and g computing a reverberant path component by $G3 \cdot \beta(i-M)$, where $\beta(i)=(-g) \cdot X(i)+(1-g2) \cdot \alpha(i-N)$, and $\alpha(i)=X(i)+g \cdot \alpha(i-N)$, wherein, $C(k)$ represents a sequence of finite impulse response coefficients, g is a gain coefficient, and M and N represent delay coefficients.

11. The method of claim 10, further comprising the step of changing the coefficients G1, G2, G3, g, M and N and finite impulse response coefficients for use in the signal processing step for the respective receiver means.

12. The method of claim 9 being performed with an occurrence of a telephone conversation in accordance with the predetermined set of coefficients, and being performed with a subsequent occurrence of a telephone conversation in accordance with an alternate predetermined set of coefficients.

* * * * *